Nov. 9, 1943.  J. KUCHO, JR  2,333,867
TROLLEY FOR OVERHEAD CONVEYERS OR THE LIKE
Filed March 24, 1942  2 Sheets-Sheet 1
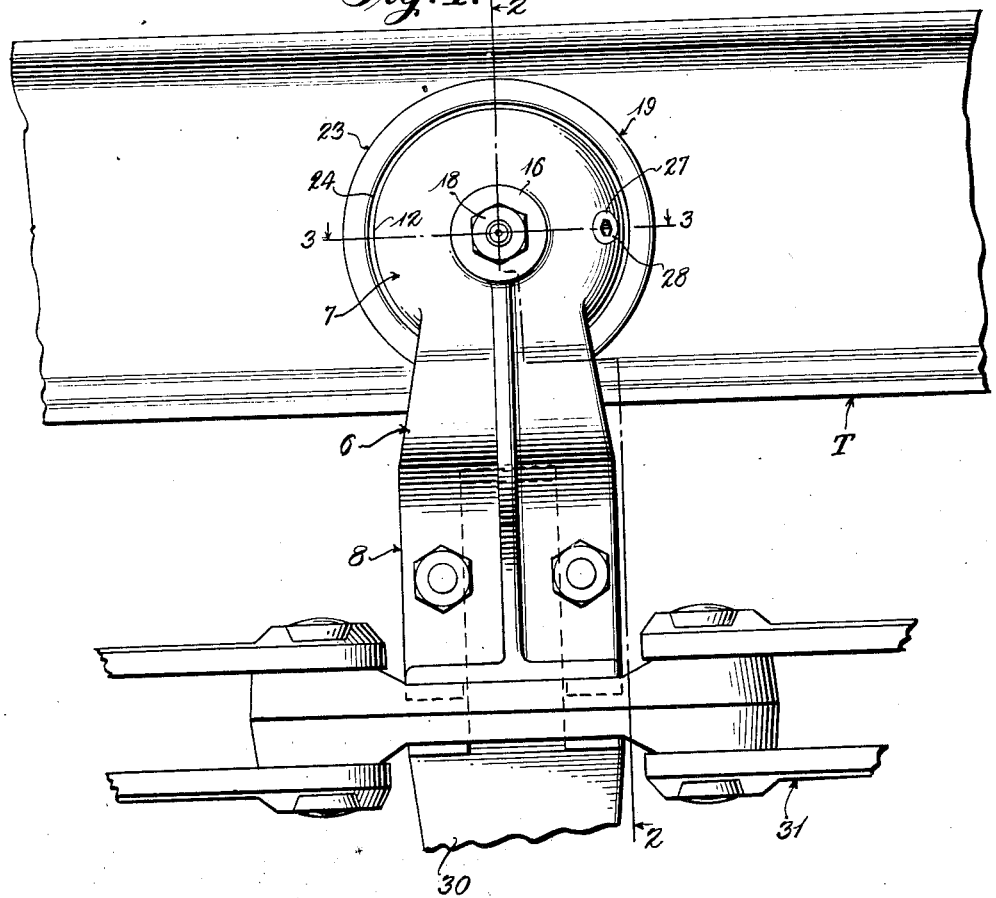
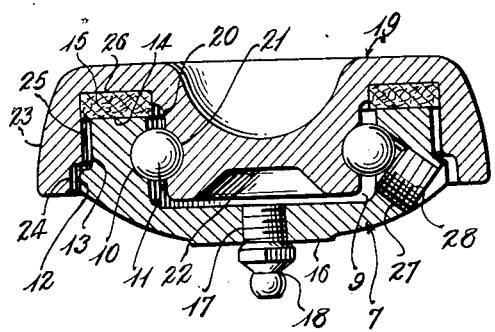
Inventor
Joseph Kucho, Jr.
By L. Donald Myers
Attorney Nov. 9, 1943. J. KUCHO, JR 2,333,867
TROLLEY FOR OVERHEAD CONVEYERS OR THE LIKE
Filed March 24, 1942 2 Sheets-Sheet 2
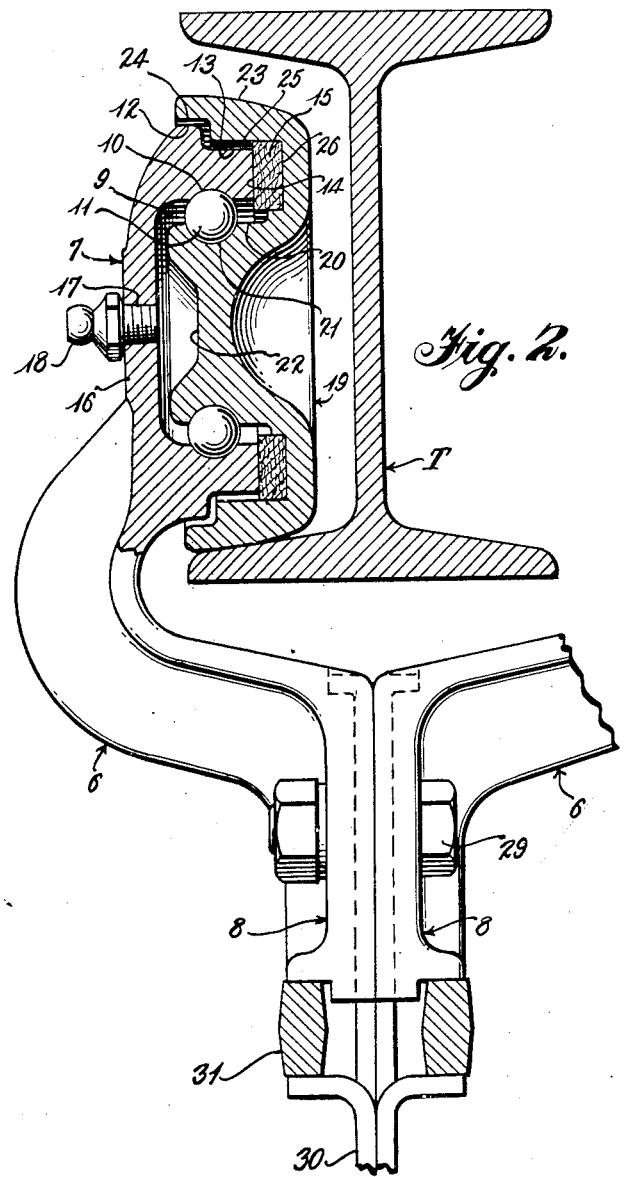
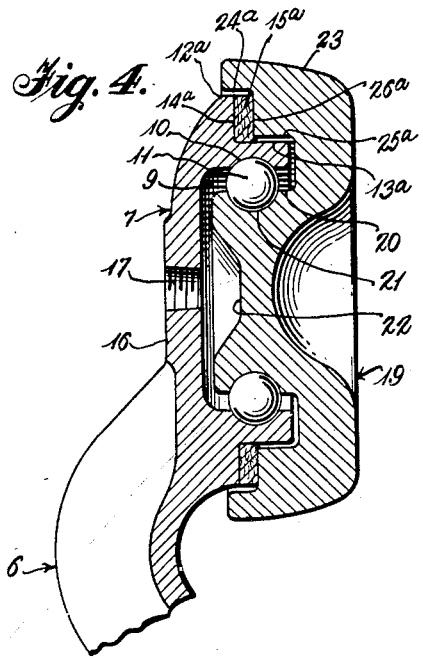
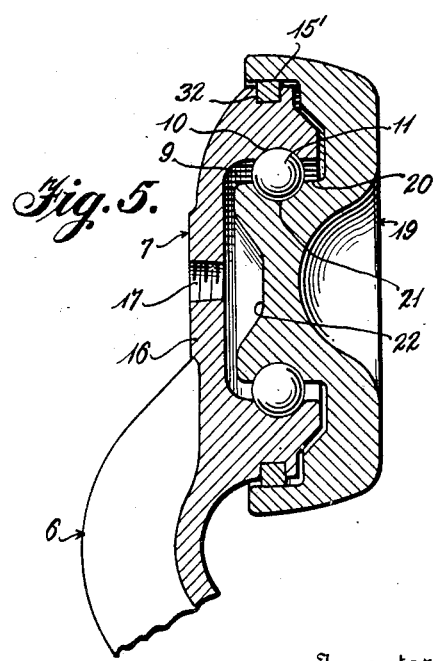
Inventor
Joseph Kucho, Jr.
By L. Donald Myers Attorney Patented Nov. 9, 1943

2,333,867

UNITED STATES PATENT OFFICE 2,333,867

TROLLEY FOR OVERHEAD CONVEYERS OR THE LIKE

Joseph Kucho, Jr., Mount Prospect, Ill., assignor to Link-Belt Company, a corporation of Illinois Application March 24, 1942, Serial No. 436,046

3 Claims. (Cl. 308—187)

This invention relates to new and useful improvements in trolleys which are particularly adapted for use in overhead conveyers, or the like.

The primary object of this invention is the provision of trolleys for overhead conveyers, or the like, and particularly of the anti-friction type, which possess high load carrying ability and long life under average service conditions because of the improvements provided in the construction, design and assembly of the bearing and the lubricant seal portions; which can be economically produced because of the extremely small number of parts employed and the minimum amount of machining and finishing operations involved; and which will present the smooth, sturdy, well-balanced appearance that is desirable in any type of plant but is particularly important in establishments where foods and beverages are prepared and packed.

Other objects and advantages of the invention will be apparent during the course of the following description.

In the accompanying drawings forming a part of this specification and in which like numerals are employed to designate like parts throughout the same, Figure 1 is a side elevational view of a trolley for an overhead conveyer, Figure 2 is a vertical sectional view taken on line 2—2 of Fig. 1, Figure 3 is a horizontal sectional view taken on line 3—3 of Fig. 1, Figure 4 is a vertical sectional view of a modified form of wheel and bracket trolley assembly, and Figure 5 is a similar view to Fig. 4 but illustrates a further modified form of trolley wheel and bracket.

In the drawings, wherein for the purpose of illustration are shown the preferred and other embodiments of this invention, and first particularly referring to Figs. 1, 2 and 3, the reference character 6 is employed to designate each one of the two brackets of a trolley assembly of the type adapted for traveling along a standard I-beam track T. Only one of the two brackets 6 is fully illustrated in Figs. 1 and 2. This bracket 6 includes the head or trolley wheel end portion 7 and the attachment or foot portion 8.

The head or trolley wheel end 7 is of substantially cup formation to provide the recess 9. The peripheral wall of this recess is provided with a deep machined groove 10 which acts as the stationary, outer raceway of the ball bearing assembly that includes a complete complement of balls 11. The peripheral surface of this cupped head is provided with two concentric, stepped or offset portions 12 and 13. These surface portions 12 and 13 are truly cylindrical or of circular formation. The extreme outer edge face 14 is normal to the axis of the pocket or recess 9 and is also normal to the peripheral surface portions 12 and 13. This outer face 14 should be machined for providing a large area bearing for the seal 15. The vertical or inner wall 16 is closed or solid except for the drilled and tapped hole 17 which receives the grease fitting 18.

A one-piece or solid forged or cast trolley wheel 19 is associated with the cupped head 7 of the bracket. This wheel, instead of following the conventional practice of carrying the outer race of the ball bearing assembly which includes an inner race that is bolted or riveted to the bracket head, is provided with an integral boss 20 that is formed with a deep machined groove 21 so that it may act as the inner rotary race of the bearing. The end face of this boss is recessed at 22 to increase the lubricant capacity of the pocket 9.

The rim portion 23 of the trolley wheel encircles or overlaps the peripheral portion of the bracket head 7 and is provided with the concentric, stepped or offset surface portions 24 and 25 that oppose the peripheral surface portions 12 and 13 of the bracket head. A machined surface 26 is provided between the boss 20 and the rim 23 for engaging the opposite side face of the seal 15.

The seal 15 may be formed of felt or any other suitable material, depending upon the temperature and service conditions to which the trolley is to be subjected. Seals formed of different materials may be interchangeably employed in this type of assembly.

Figs. 1 and 3 disclose the head 7 of the bracket as having a ball loading hole 27 formed therein. A screw 28 is received in this hole for retaining the balls 11 in place between the two races. By having the outer race formed as a part of the bracket head, it is possible to form this ball loading hole 27 in a stationary part of the assembly. The use of a ball loading hole permits a complete complement of balls 11 to be assembled between the two races with the result that no ball retainers need be employed.

The lower ends of the two brackets 6 will be connected together by the bolts 29. Suitable clevis, bar or idler attachments 30 may be connected to the bracket ends 8 and these attachments may be employed for joining the trolley with the chain 31.

Figs. 4 and 5 disclose modifications of the bracket head and trolley wheel for accommodating different types of seals. Because the portions of the bracket and wheel which cooperate with these seals are the only parts which have been modified, the specific description of Figs. 4 and 5 will be limited to these portions. The same reference characters employed in Figs. 1 to 3 inclusive for identifying the other parts will be applied to the structures of Figs. 4 and 5.

In Fig. 4 the felt seal 15a is received between the two machined surfaces 14a and 26a of the bracket and wheel respectively. These surfaces 14a and 26a are parallel with each other and are normal to the axis of the wheel 19 and the bracket head 7. They are located between the stepped peripheral surfaces 12a and 13a of the bracket and the stepped surfaces 24a and 25a that are formed on the inside of the wheel rim 23. Therefore, in this assembly the seal 15a is located closer to the entrance of the space or annular passage that is formed between the opposing surfaces of the bracket head 7 and wheel rim 23.

Fig. 5 shows the bracket and wheel assembly with the grease sealing being accomplished by means of the metal piston ring 15' which is seated in a groove 32 that is formed in the periphery of the bracket head 7. This type of seal is intended to be employed when the trolley is to be subjected to high temperatures. Like the seal of Fig. 4, this ring 15' is located adjacent the entrance to the space or annular passage that is formed between the cooperating surfaces of the bracket head 7 and wheel 19.

It readily will be appreciated that the overhead conveyer trolleys embodying this invention may be produced very economically because of the extremely small number of parts that are employed and the few machining or finishing operations involved. There are only two basic elements incorporated in the assembly and these are the bracket 6 and the wheel 9. Each one of these two parts require two complementary machining operations to form the ball receiving grooves 10 and 21 and the seal engaging surfaces 14—26, etc. In addition to the bracket 6 and the wheel 9 there are provided the set of balls 11 and the seal 15, etc. The balls are standard items and the seals are of extremely inexpensive construction. Of course, drilling and tapping operations must be performed to provide the holes 17 and 27 for the grease fitting 18 and the screw 28 respectively. This brings the total number of major machining or finishing operations to six. The only places at which close tolerances must be maintained are the two ball grooves 10 and 21.

By forming one of the ball races as an integral part of the bracket 6, the overhung loads are minimized to a considerable extent as compared with structures that employ shafts or pins for associating races with the brackets. This feature will be readily apparent by comparing the location of the upper end or head 7 of the bracket with respect to the adjacent flanges of the standard I-beam T. The head of the bracket projects only a slight distance beyond the side margins of the beam.

The provision of the rotary ball race as an integral part of the wheel 19 and the location of this race within the cupped head 7 of the bracket materially reduces the axial overall dimensions of the head assembly of the trolley. Because the wheel can be formed as a solid or one-piece forging or casting, its manufacturing cost will be extremely low. This one-piece casting or forging not only provides the wheel of the assembly but it also includes one of the races for the balls.

The size, location and type of engagement of the seals 15 and 15a, in the forms of the invention shown in Figs. 1 to 4 inclusive, play an important part in the ability of this trolley assembly to remain in a serviceable condition for a long period of time. It will be noted that these two seals engage opposed radial surfaces of the bracket head 7 and the wheel 19. These cooperating surfaces, plus the fact that the seal is of unusually large diameter for a structure of this character, provide large areas of contact with the result that the seals will have a much longer life than is normally anticipated. Of course, the longer the serviceable life of a seal of this character, the longer the period of time it will effectively operate to retain the lubricant within the bearing pocket 9 and the longer the time it will prevent the admission of foreign matter to the bearing that results in a rapid increase in the rate of wear.

Because the seals engage surfaces that are integral with the bracket and the wheel, and are of unusually large area, conventional seal retainers and shields need not be employed. The omission of such retainers and shields as a part of the lubricant seal lowers the cost of this item to such an extent that it will be possible to include the seals as a part of standard equipment, rather than special equipment. However, the trolleys would operate efficiently if the seals were omitted from the several forms and an oil used as the lubricant. In the form of the invention shown in Figs. 1 to 3 inclusive, the seal 15 is located at the inner end or inner side of an offset passage or annular space that is formed between the opposed, stepped surfaces 12 and 13 of the bracket head 7 and 24 and 25 of the wheel rim 23. Consequently, any foreign matter which attempts to work its way into the seal 15 must travel through this tortuous path. The formation of the path, naturally, will retard admission of dust, grit, or the like.

By providing the ball loading hole 27 in the head 7 of the bracket, a full complement of balls may be positioned in the grooves 10 and 21 of the two races. These balls constitute the sole means for retaining the wheel assembled on the upper end of the bracket.

Because a full complement of balls may be positioned in the bearing through the loading hole 27, no retainer structure for the balls need by provided. The omission of a retainer will prolong the serviceable life of the bearing because ball retainers frequently are responsible for bearing failures. This is due to the fact that the retainers are usually softer than the ball and race surfaces and are subjected to more rapid wear and abrasion from dust, etc.

It will be appreciated that by forming the races in the head of the bracelet and the boss of the wheel, an unusually large diameter bearing is provided for this type of structure and a larger number of balls may be employed. Consequently, the load imposed on each ball is considerably less with the result that the bearing will have a much longer life than usual and the load capacity for a given size wheel may be increased considerably.

The pocket or chamber 9, formed by the cooperating parts of the bracket head 7 and the wheel boss 20, will provide ample grease capacity for the bearing so that frequent recharging will not be necessary. Although the seals 15 and 15a are of large diameter and possess considerable radial depth, they are only called upon to prevent the loss of lubricant through a relatively thin space which is formed at the outer side of the bearing. Additionally, the tortuous space or passage through which foreign matter may pass is comparatively thin as compared to the radial depth of the seal with the result that the seal will be capable of effectively excluding the foreign matter from the bearing.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a trolley assembly for overhead conveyers, a bracket for connection with a conveyer chain and having a side opening cup-shaped head on its upper end portion formed with a bearing race on the inner surface of its annular wall; a one-piece wheel member providing an axial boss, having a bearing race formed on its periphery, received in the bracket head, and a rim encircling the boss and the annular wall of the bracket head and having its track engaging tread surface arranged in radial alignment with the bearing races of the bracket head and wheel boss; a set of bearing members received in the bearing races, and a lubricant seal engaging complementary surfaces on the bracket head and the wheel member and arranged to retain lubricant in and exclude foreign matter from the space formed between the annular wall of the bracket head and the wheel boss.

2. In a trolley assembly for overhead conveyers, a bracket for suspending a conveyer chain and having a side opening cup-shaped head on its upper end portion formed with a bearing race on the inner surface of its annular wall; a one-piece wheel member providing an axial boss, having a bearing race formed on its periphery, received in the bracket head, and a rim encircling the boss and spaced therefrom to form an annular recess to receive the annular wall of the bracket head, said rim having its track engaging tread surface arranged in radial alignment with the bearing races of the bracket head and wheel boss, the annular wall of the bracket head and the wheel member being formed with complementary stepped surfaces to provide a narrow tortuous passage through which foreign matter must travel to reach the bearing race and with complementary finished surfaces to act as a seat for a seal, a set of bearing members received in the bearing races and forming the sole means for retaining the bracket and wheel assembled, and a sealing member engaging the complementary finished surfaces to cooperate therewith in retaining a lubricant in and excluding foreign matter from the space formed between the annular wall of the bracket head and the wheel base.

3. In a trolley assembly for overhead conveyers, a bracket for suspending a conveyer chain and having a side opening cup-shaped head on its upper end portion formed with a bearing race on the inner surface of its annular wall; a one-piece wheel member providing an axial boss, having a bearing race formed on its periphery, received in the bracket head, and a rim encircling the boss and spaced therefrom to form an annular recess to receive the annular wall of the bracket head, said rim having its track engaging tread surface arranged in radial alignment with the bearing races of the bracket head and wheel boss, the exterior of the annular wall of the bracket head and the interior of the wheel rim being formed with complementary stepped surfaces to provide a narrow tortuous passage through which foreign matter must travel to reach the bearing races, the edge of the annular wall of the bracket head and the portion of the wheel member arranged between its boss and rim being formed with complementary radially arranged finished surfaces to act as a seat for a seal, a set of bearing members received in the bearing races, and a sealing member engaging the complementary finished surfaces to retain lubricant in the space formed between the annular wall of the bracket head and the wheel boss and to exclude foreign matter that succeeds in traveling through said narrow tortuous passage from the lubricant space.

JOSEPH KUCHO, Jr.